O. STANGLAND.
MOUNTING FOR ANTIFRICTION BEARINGS.
APPLICATION FILED MAR. 29, 1920.
1,377,637.
Patented May 10, 1921.
2 SHEETS—SHEET 1.
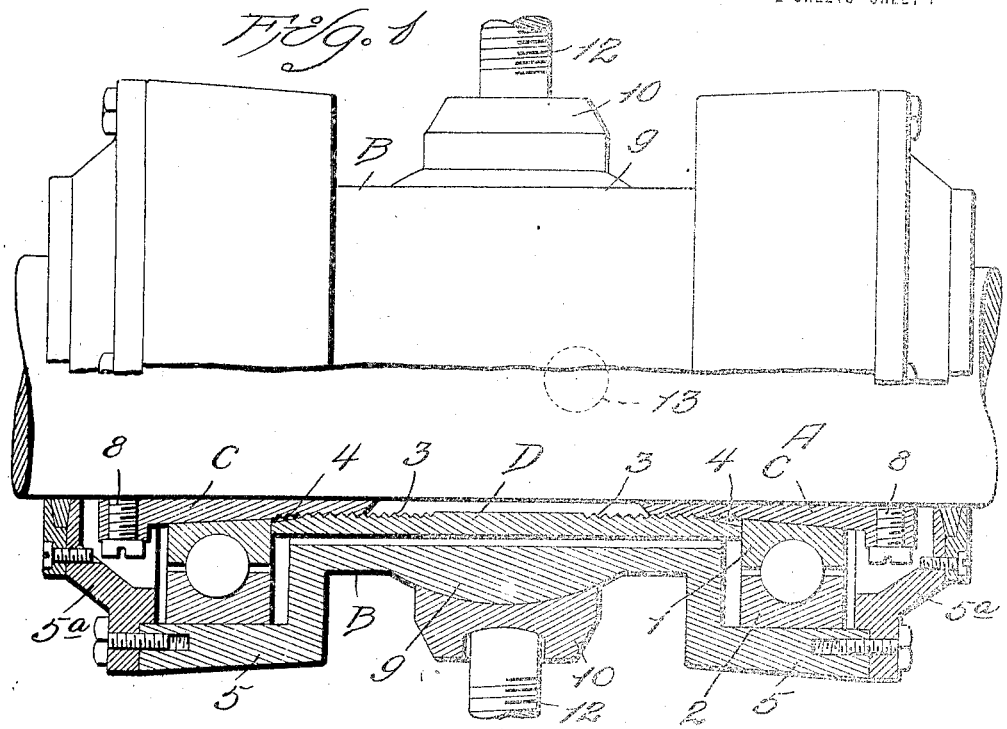
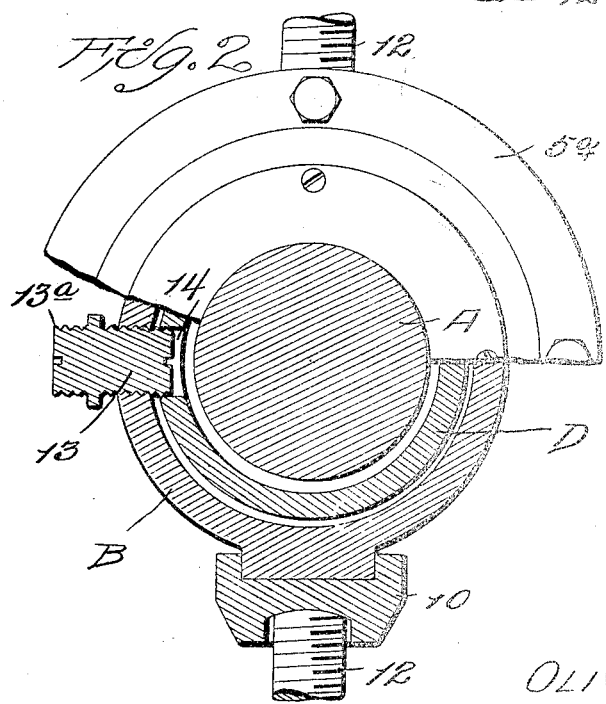
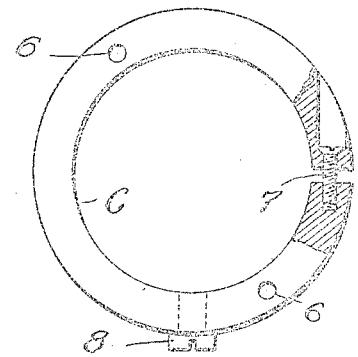
INVENTOR
OLIVER STANGLAND,
by Bakewell & Cornwell ATTORNEYS.

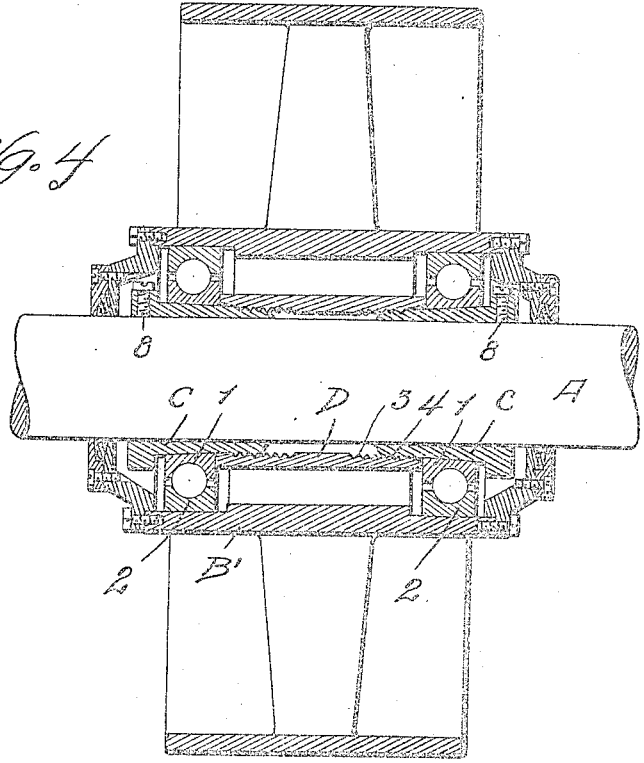
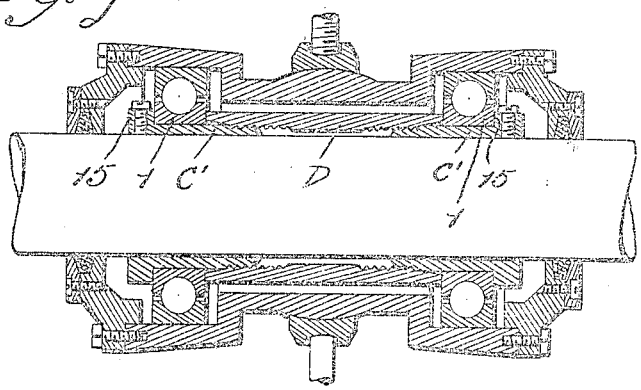

UNITED STATES PATENT OFFICE.

OLIVER STANGLAND, OF ST. LOUIS, MISSOURI.

MOUNTING FOR ANTIFRICTION-BEARINGS.

1,377,637.   Specification of Letters Patent.   Patented May 10, 1921.

Application filed March 29, 1920. Serial No. 369,728.

*To all whom it may concern:*

Be it known that I, OLIVER STANGLAND, a citizen of the United States, residing at St. Louis, Missouri, have invented a certain new and useful Improvement in Mountings for Antifriction-Bearings, of which the following is a full, clear, and exact description, such as will enable others skilled in the art to which it appertains to make and use the same.

This invention relates to mountings for anti-friction bearings.

One object of the invention is to provide a mounting for anti-friction bearings that is of simple construction, inexpensive to manufacture and of such design that it can be installed by an inexperienced person without liability of subjecting the members of the bearings carried by same to undue strains.

Another object is to provide a compact mounting for anti-friction bearings that insures the positive locking together of the component parts of the entire mounting without having to depend upon the outer housing and the end caps of the housing to lock the parts in operative relation, and which is of such design that the bearings carried by the mounting will not be subjected to end thrusts from the shaft or part carried by the bearings.

Another object is to provide a mounting of the character above described which is also self-alining, thus compensating for all shaft deflection and vibration without endangering the bearings supported by the mounting.

Another object is to provide an anti-friction bearing mounting of simple design, which, in addition to embodying the desirable features and characteristics above mentioned, also insures accurate centering of the bearings with relation to the shaft.

And still another object is to provide an efficient mounting for anti-friction bearings that can be applied easily to standard makes of shaft bearing frames, stands and brackets and which has provision for supporting two anti-friction bearings, thus insuring an adequate support for a shaft or other element without resorting to the use of a heavy duty anti-friction bearing.

My improved mounting can be used for supporting various makes of ball bearings and roller bearings, and is capable of use in shafting boxes for the transmission of power through line shafts, jack shafts, machine shafts and counter shafts, in various kinds of pulleys, and in fact, in any place where the use of a portable anti-friction bearing mounting is a desirable substitute for the commonly used sleeve bearing.

Briefly described, my improved mounting consists of two adapter sleeves that are adapted to be spaced apart and arranged inside of the inner race members of two anti-friction bearings, and a connecting element arranged between said adapter sleeves and joined to same by screw threads in such a manner that relative rotative movement of said adapter sleeves and connecting element causes the race members of the bearings to be locked securely in operative position without liability of subjecting the bearing members to undue strains.

Figure 1 of the drawings is a side elevational view, partly in vertical section, of an anti-friction bearing mounting constructed in accordance with my invention, and designed so that it automatically compensates for any deflection or vibration of the shaft or other part supported by the bearings carried by the mounting.

Fig. 2 is an end view of said mounting, partly in transverse section.

Fig. 3 is an end view of one of the adapter sleeves, partly in vertical section.

Fig. 4 is a view, illustrating my improved mounting used in a pulley; and

Fig. 5 is a vertical sectional view of a mounting constructed in accordance with my invention and used for supporting anti-friction bearings whose inner race members have a piston fit or air fit on the adapter sleeves, and the adapter sleeves in turn being bored to have a piston fit or air fit on a shaft supported by the bearings.

Referring to Fig. 1 of the drawings, which illustrates one form of my invention, A designates a shaft that is supported by two ball bearings, each of which has an inner race member 1 and an outer race member 2. Said bearings are spaced apart and are retained in operative position within a housing B by means of two adapter sleeves C and a connecting element D that joins said adapter sleeves together. The adapter sleeves C are mounted on the shaft A inside of the inner race members 1 of the bearings, and the connecting element D is arranged between said adapter sleeves and is connected to same by means of internal screw threads 3 on the connecting element D that coöperate with external screw threads 4 on the inner end portions of the adapter sleeves, the connecting element D being of tubular form and arranged longitudinally of the shaft A, so that the end portions of same surround the inner end portions of the adapter sleeves C. In the form of my invention shown in Fig. 1 the outer surfaces of the adapter sleeves are tapered and the bores in the inner race members 1 of the bearings through which said adapter sleeves pass are also tapered, thereby permitting the bearing members to be locked securely in position by rotating the adapter sleeves in such a direction that they will be screwed inwardly into the connecting element D, causing the inner race members 1 to be clamped securely to the adapter sleeves C. The connecting element D is preferably so proportioned that the ends of same bear against the inner race members 1 of the bearings and hold said inner race members spaced apart and out of contact with the side walls of the portions 5 of the housing B in which the bearings are mounted, and holes 6 are preferably formed in the outer ends of the adapter sleeves, as shown in Fig. 3, so as to permit the adapter sleeves to be tightened with spanner wrenches. In the mounting illustrated in Fig. 1 each adapter sleeve C is split longitudinally, as shown in Fig. 3, and is provided with a screw 7 that is adapted to be tightened so as to connect said sleeve securely to the shaft A. Each adapter sleeve is also provided with a set screw or similar device 8 that is adapted to be screwed inwardly into engagement with the shaft A, so as to prevent the sleeve from backing off or the entire mounting from slipping endwise.

In installing the device the adapter sleeves C are screwed into the master sleeve or connecting element D, using two spanner wrenches for this purpose. When the adapter sleeves cease turning on the shaft A, the operation of installing the device is complete, except for tightening the lock screws 7, used to draw the adapter sleeves together, and tightening the set screws 8, used to prevent the adapter sleeves from backing off and to prevent end slippage of the entire mounting. When the adapter sleeves cease turning on the shaft without undue tension being exerted on the spanner wrenches, the entire mounting is firmly held in place for all practical purposes, and no undue outward strain is placed upon the inner race members of the bearings, thus eliminating the possibility of the bearings being injured, as so often occurs in the operation of tightening the adapter sleeves of anti-friction bearing mountings of the kind now in general use. With my improved bearing mounting it is practically impossible to subject the inner race members of the bearings to undue strains when the adapter sleeves are tightened with spanner wrenches, and furthermore, my improved mounting can be installed by an inexperienced person, thereby overcoming the necessity of employing a high-priced mechanic or millwright to install the mounting. My improved mounting is adapted to be used with ball bearings or roller bearings, and it is so designed that it insures the positive locking together of the component parts of the entire mounting without having to depend upon the outer housing B or the removable end caps 5ª of said housing to lock the parts together.

Still another desirable feature of such a bearing mounting is that it can be used successfully on very long shafts, due to the fact that it is so designed that the bearings are not subjected to end thrusts from the shaft. In order to compensate for shaft deflection and vibration, I prefer to provide the housing B with a substantially cylindrical-shaped portion 9 that is rockably mounted in the supporting structure that carries the housing B, said supporting structure being of any preferred form, so long as it is so designed that it permits the housing B to rock slightly, and thus compensate for deflection or vibration of the shaft A. In the form of my invention shown in Fig. 1 the supporting structure for the housing B comprises shoes 10 having concaved surfaces that conform to the convexed portion 9 on the housing B, said shoes being combined with suspension bolts 12, so as to provide a practically universal joint between the mounting and the supporting structure that carries the mounting.

Any preferred means can be used for preventing the master sleeve or connecting element D from rotating during the operation of tightening the adapter sleeves C, the means that I prefer to use for this purpose consisting of a screw 13 shown in Fig. 2 that is adapted to be screwed into an internally screw-threaded opening in the sleeve B far enough to cause the inner end portion of said screw 13 to enter a hole 14 in the master sleeve D. After the adapter sleeves have been properly adjusted the screw 13 is removed from the housing B and turned end for end so that the short screw threaded portion 13ª on said screw can be screwed into the internally screw-threaded hole in the housing B, the screw 13 then acting as a dust plug that prevents dirt and the like from entering the housing B.

In Fig. 4 of the drawings I have shown my improved mounting used with a pulley which may be either a loose pulley, a friction clutch pulley, a mule pulley, an idler pulley, or a tightener pulley. The various parts of the mounting are substantially the same as the parts of the mounting shown in Fig. 1, with the exception that the hub B' of the pulley is used in place of the housing to carry the outer race members 2 of the bearings.

In Fig. 5 of the drawings I have illustrated an anti-friction bearing mounting constructed in accordance with my invention, such as can be used when it is possible to control the size of the shaft, rod pin or gudgeon upon which the mounting is installed and which has a practically air or piston fit with the bore of the adapter sleeves C. In this form of my invention each of the adapter sleeves C' consists of a non-split sleeve having a straight cylindrical portion that fits in a straight, cylindrical bore in the inner race member 1 of the bearing with which it coöperates, the adapter sleeves C' being so constructed that the flanges 15 on the outer ends of same bear against the inner race members 1 of the bearings, and thus clamp said inner race members securely against the ends of the master sleeve or connecting element D.

An anti-friction bearing mounting of the construction above described overcomes a serious defect of bearing mountings of the kind now in use that are equipped with adapted sleeves, owing to the fact that it permits the adapter sleeves to be tightened without liability of subjecting the bearing members to undue strains; it comprises only a few parts of simple design, thus permitting it to be manufactured at a low cost; it can be easily installed by an unskilled person; it insures concentric arrangement of the bearings and the shaft, thus eliminating vibration due to eccentric bearing mountings; it is self-alining so that it automatically compensates for shaft deflection and vibration; it is of such design that the bearings will not be subjected to end thrusts, thus compensating for contraction and expansion of the shaft, due to changes in temperature; it can be used with various makes of ball bearings and roller bearings and can be applied easily to various kinds of supporting frames, stands or brackets, and as it has provision for supporting two bearings, it provides sufficient bearing capacity for the shaft without resorting to a heavy duty anti-friction bearing.

Having thus described my invention, what I claim as new and desire to secure by Letters Patent is:

1. A mounting for anti-friction shaft bearings, comprising two spaced bearings, each of which has an inner and an outer race member, two adapter sleeves that are adapted to be interposed between the inner race members of the bearings and a shaft, and a connecting element combined with said adapter sleeves in such a manner that relative rotative movement of said sleeves and connecting element causes the race members of the two bearings to be clamped securely in operative position.

2. A mounting for anti-friction shaft bearings, comprising two spaced bearings provided with inner and outer race members, adapter sleeves that are adapted to be inserted between a shaft and the inner race members of said spaced bearings, and a connecting element interposed between the inner race members of the bearings and joined to said adapter sleeves in such a manner that the bearing members can be clamped securely in operative position by rotating said adapter sleeves in a direction to screw them into said connecting element.

3. A mounting for anti-friction shaft bearings, comprising two spaced bearings, each of which has an inner race member that surrounds a shaft, a spacing element adapted to be arranged between said bearings, and sleeves inserted between the shaft and the inner race members of the bearings and screwed into said connecting element in such a manner that when said sleeves are tightened the bearing members will be clamped securely in operative position.

4. A mounting for anti-friction bearings, comprising a part that is adapted to receive the outer race members of two spaced bearings, a spacing sleeve that is adapted to be interposed between the inner race members of said bearings, and devices arranged in the bores of said inner race members and screwed into said spacing sleeve for securing the bearings in operative position.

5. A mounting for anti-friction bearings, comprising a spacing device that is adapted to be arranged on a shaft or similar part, two spaced anti-friction bearings surrounding the ends of said spacing device bearing against the inner race members of said bearings, and sleeves interposed between the shaft and the inner race members of the bearings and screwed into the ends of said spacing device in such a manner that the operation of tightening said sleeves will cause the bearing members to be clamped securely in operative position.

6. A mounting for anti-friction shaft bearings, comprising a spacing sleeve, two spaced anti-friction bearings arranged at the ends of said sleeve, and tapered adapter sleeves adapted to be inserted between a shaft and inner race members of said bearings and provided with external screw threads that coöperate with internal screw threads on said spacing sleeve to hold said elements in assembled relation.

7. A mounting for anti-friction bearings, comprising a spacing sleeve interposed between the inner race members of two spaced bearings, an element that surrounds the outer race members of said bearings, adapter sleeves arranged between the inner race members of the bearing and the shaft supported by the bearings and having their inner end portions screwed into said spacing sleeve, and means for preventing said adapter sleeves from working loose.

8. A mounting for anti-friction bearings, comprising a housing, a supporting structure in which said housing is rockably mounted, portions on said housing that surround the outer race members of two spaced anti-friction bearings, a spacing sleeve interposed between the inner race members of said bearings, and devices screwed into said spacing sleeve in such a manner that when said devices are tightened the members of the bearings will be clamped securely in operative position.

9. A mounting for anti-friction bearings, comprising a housing provided with means for enabling it to be rockably mounted in a supporting structure, portions on said housing for receiving the outer race members of two spaced anti-friction bearings, and means for holding the bearings in concentric relation with the shaft supported by the bearings and in operative position in said housing.

10. A mounting for anti-friction bearings, comprising a spacing element adapted to be interposed between two spaced bearings, retaining devices screwed into said spacing device for securing the members of the bearings in operative position, and means for preventing said spacing device from turning when said retaining devices are being screwed into same.

11. A mounting for anti-friction bearings, comprising a part that is adapted to receive the outer race members of two spaced anti-friction bearings, a spacing element interposed between the bearings, and adjustable means combined with said spacing element for retaining the members of the bearing in operative position and centering the bearings with relation to the shaft supported by the bearings.

OLIVER STANGLAND.